United States Patent [19]
Pepin et al.

[11] Patent Number: 5,126,915
[45] Date of Patent: Jun. 30, 1992

[54] METAL OXIDE-COATED ELECTRICALLY CONDUCTIVE POWDERS AND COMPOSITIONS THEREOF

[75] Inventors: John G. Pepin, Newark; Howard W. Jacobson, Wilmington, both of Del.

[73] Assignee: E. I. Du Pont de Nemours and Company, Wilmington, Del.

[21] Appl. No.: 725,778

[22] Filed: Jun. 17, 1991

Related U.S. Application Data

[63] Continuation-in-part of Ser. No. 575,657, Aug. 30, 1990, which is a continuation-in-part of Ser. No. 385,309, Jul 28, 1989, Pat. No. 4,954,926.

[51] Int. Cl.⁵ .................... H01G 1/015; H01G 4/10
[52] U.S. Cl. .................... 361/304; 361/321
[58] Field of Search .................... 361/303–305, 361/320, 321, 328, 329, 330; 29/25.42

[56] References Cited

U.S. PATENT DOCUMENTS

| | | | |
|---|---|---|---|
| 2,237,066 | 2/1966 | Martin et al. | 361/304 |
| 3,851,228 | 11/1974 | Sheard | 361/321 X |
| 4,325,763 | 4/1982 | Utsumi et al. | 361/321 X |
| 4,954,926 | 9/1990 | Pepin | 361/304 |

*Primary Examiner*—Donald A. Griffin

[57] ABSTRACT

Finely divided particles of electrically conductive metal having a coating thereon a refractory metal oxide which is insoluble in the electrically conductive metal and non-reducing in the present of the electrically conductive metal, (2) the coating being sufficiently thick that the Isoelectric Point of the coated conductive metal particles is at least 1 unit higher than the Isoelectric Point of particles of the refractory metal oxide, (2) the tap density of the coated metal particles is at least 90% as high as the tap density of the uncoated metal particles, and (3) the metal oxide coating constitutes at least 0.05% by weight of the coated particles.

16 Claims, 5 Drawing Sheets

METAL OXIDE-COATED ELECTRICALLY CONDUCTIVE POWDERS AND COMPOSITIONS THEREOF

CROSS-REFERENCE TO RELATED APPLICATION

This application is a continuation-in-part of applicant's copending U.S. patent application Ser. No. 07/575,657 filed Aug. 30, 1990, which is a continuation-in-part of Ser. No. 385,309 filed Jul. 28, 1989 U.S. Pat. No. 4,954,926.

BACKGROUND OF THE INVENTION

Multilayer ceramic capacitors consist of a plurality of interleaved and staggered layers of an electrically conductive film of metal (termed "electrode"), formed by the deposition (usually by screen printing or variations thereof) of a thick film paste (termed an "electrode composition") and electrically insulating layers of a ceramic oxide (termed "dielectric"), formed by laying a cast dielectric tape or by casting a dielectric slurry over the dried electrode. Such capacitors are well known in the art. U.S. Pat. No. 2,389,420, for example, describes the structure, manufacture and properties of monolithic multilayer ceramic capacitors (MLCs).

The electrode composition is usually a dispersion of finely divided precious metal powders such as palladium, silver, gold or platinum or their mixtures in a vehicle which is usually solely organic in nature. Dispersions of non-precious metals such as copper and nickel have also been shown to have utility in electrode compositions. The vehicle or organic medium is usually composed of a mixture of a polymeric resin which imparts viscosity to the composition and appropriate solvents for processing compatibility, particularly with respect to drying. Other organic materials are usually added to the vehicle to control paste rheology. Typical electrode composition metal concentrations range from 40 to 70% by weight, with the remainder being vehicle. Electrode compositions are deposited, usually by screen printing techniques, on dried dielectric layers, then dried to remove solvents and leave a mixture of metal powders and resin.

The dielectric layer is usually composed of finely divided oxide powders dispersed in a resin. Barium titanate ($BaTiO_3$) and other oxides such as neodymium titanate ($Nd_2Ti_2O_7$) strontium titanate ($SrTiO_3$) and magnesium titanate ($MgTiO_3$) are used. Additions are usually made to these oxides to control various electrical characteristics, particularly to maximize dielectric constant (K) while controlling the temperature dependence of dielectric constant and insulation resistance, among other properties. The resin is present in the dielectric layers to facilitate handling during manufacture.

Multilayer ceramic capacitors are manufactured by building up an interleaved configuration of electrode and dielectric layers, dicing individual parts out of the build-up, subjecting the parts to a slow burnout and then high temperature firing. Burnout is done to remove the organic resin in the electrode and dielectric layers to avoid rapid outgassing and rupture of the parts. Firing is done to a peak temperature (the "dielectric maturation temperature") both to densify the dielectric for maximum dielectric constant and physical strength and to react the chemical constituents of the dielectric so that other desired electrical characteristics are achieved. During the firing step, the powder grains in the electrode layers also sinter and densify to produce a continuous, highly electrically conductive metal film.

A principal problem in multilayer ceramic capacitor manufacture originates from the firing of the electrode and dielectric films simultaneously. During firing, a common physical defect termed a "delamination" is formed. Delaminations are defined as separations of the electrode and dielectric layers which cause a void in what is meant to be a monolithic solid body. Delaminations are detrimental to finished capacitor performance because they can cause electrodes of opposite polarity to contact and form an electrical short. Delaminations can also trap liquids used in subsequent processing. These liquids can leave electrical charge carriers in the delamination voids and thus reduce the insulation resistance of the finished part. For high parts yields and maximum reliability of the finished parts, delaminations must be closely controlled and preferably eliminated entirely.

The dielectric maturation temperature determines the metal powders used in the electrode. The metals are chosen to have melting points above the dielectric maturation temperature to avoid melting the electrode during firing and the formation of discontinuous fired metal films. For example, dielectrics which mature at 1350° C. require use of electrode compositions which contain only palladium, gold or platinum powders or their mixtures because of the high melting point of these metals and their alloys. Lower firing dielectrics, such as those which fire at 1100° C., typically permit use of electrode compositions which contain mixtures of palladium and silver in the weight ratio of 30%:70%. Dielectrics which can be fired in non-oxidizing atmospheres permit use of non-precious metal electrodes. Mixtures of Pd and Ag are used with low firing dielectric compositions since Ag is less expensive than Pd and the lower dielectric maturation temperature allows Ag to be used. Typically Pd/Ag electrodes begin to sinter before the dielectric layers sinter and a shrinkage mismatch takes place which usually leads to delaminations in the finished MLC part. The same phenomenon, however, also occurs when 100% Pd electrodes are used on higher firing dielectric bodies.

One method of sintering shrinkage mismatch control common to the MLC industry is the incorporation of inorganic oxides into the electrode composition to inhibit, or move the temperature of rapid sintering shrinkage of the Pd and Pd/Ag powders to higher temperatures. These inorganic oxides upon firing must be non-reducing in the Pd or Pd/Ag metals because, if a reaction between the Pd or Pd/Ag results in the reduction of the metal oxide to its metal moiety, that metal moiety can act as a low temperature flux to promote the sintering of the Pd or Pd/Ag, thereby aggravating the mismatch of the sintering shrinkage of the electrode and dielectric. In addition, in order for an oxide to act as a sintering inhibitor, the oxide must also be insoluble in the Pd or Pd/Ag since a soluble oxide can also act to promote sintering and subsequent densification.

Usually an oxide ceramic powder which will not be detrimental to the dielectric layers is chosen as the sintering inhibitor. Typical examples include barium titanate, aluminum oxide, silicon oxide, etc. A principal problem with use of a separate oxide is that it must be well dispersed throughout the electrode paste in order to be effective. Standard milling techniques for dispersing a precious metal powder in a viscous paste vehicle, however, are usually not adequate to disperse the oxide additives. To achieve adequate additive dispersion, a high amount of dispersion energy must be used, but this will also tend to deform the precious metal grains to the point where ultimate performance of the electrode paste is degraded. For this reason, another method of intimately mixing the oxide sintering inhibitor with the precious metal powder is required. An additional constraint on any oxide additions to the electrode for the purpose of inhibiting sintering shrinkage is that the amount of oxide used must be as low as possible. Incorporating oxides into the fired layers of electrode can cause decreased electrical conductivity of the electrode layer, leading to higher electrical losses and finished MLCs which do not meet specifications. This is particularly important for capacitors which are used at high applied frequencies where electrode electrical conductivity is an important factor in overall electrical loss of the part.

Pepin, in U.S. Pat. No. 4,954,926, describes a method in which the sintering inhibitor is added to the organic medium as a liquid metal resinate. The previously discussed restrictions on the metal oxide products of the decomposition of these resinates apply in order effectively to inhibit the sintering of the Pd or Pd/Ag. By adding metal resinates, a particularly good dispersion of the metal oxide sintering inhibitor is achieved.

This invention is directed to yet another effective means of incorporating metal oxide sintering inhibitors into MLC electrodes. For the purposes of the discussion and the examples, the metallurgies used in the MLC electrode compositions will be exemplified by Pd and Pd/Ag, but the technology disclosed is applicable to other metallurgies including both the precious metals and non-precious metals which could be used in MLC electrodes.

SUMMARY OF THE INVENTION

In a primary aspect, the invention is directed to finely divided particles of electrically conductive metal selected from the group consisting of Pd, Ag, Pt, Au, Cu, Ni and mixtures and alloys thereof having a coating thereon of a refractory metal oxide which is insoluble in the electrically conductive metal and non-reducing in the present of the electrically conductive metal, (1) the coating being sufficiently thick that the Isoelectric Point of the coated conductive metal particles is at least 1 unit higher than the Isoelectric Point of particles of the refractory metal, (2) the tap density of the coated metal particles is at least 90% of the tap density of the uncoated metal particles, and (3) the metal oxide coating constitutes at least 0.05% by weight of the coated particles.

In a second aspect, the invention is directed to thick film compositions comprising the above-described particles dispersed in liquid organic medium comprising a binder polymer dissolved in a non-volatile solvent.

PRIOR ART

Japanese Patent 9050924-B

This patent is directed to electrode pastes for use in ceramic capacitors consisting of conductive metal powders, such as Pd, Pt, Au, Ag, and Ag/Pd alloy, and organometallic compound powders dispersed in organic medium. When the composition is heated to 200°–400° C., the organometallic particles decompose to form the corresponding metal or metal oxides. When the composition is fired at 1200°–1400° C., contact probability among the particles is reduced by the intervening metal or metal oxide particles thus avoiding discontinuous grain growth and the formation of large particles at the expense of smaller particles. The reference is concerned only with avoiding porous fired electrode films and is not directed to the problem of shrinkage.

U.S. Pat. No. 4,521,329, Siuta et al

This patent is directed to thick film compositions comprising copper oxide-coated particles and inorganic binder dispersed in a low-resin organic medium. Additional copper oxide is provided in the composition by direct addition of copper oxide particles into the dispersion or by including the copper oxide in the inorganic binder.

U.S. Pat. Nos. 4,594,181 and 4,600,604, Siuta

These two patents are directed to copper particles having a coating of a metal oxide having a free energy of formation more negative than −98 kcal/mole. The purpose of the metal oxide coating is to improve the sintering and shrinkage properties of the copper particles.

U.S. Pat. No. 4,687,597, Siuta

The patent discloses a fritless copper conductor composition comprising an admixture of finely divided particles of copper and a reducible heavy metal oxide such as PbO and $Bi_2O_3$. A purpose of the reducible heavy metal oxide is to reduce sintering of the copper. The metal oxide is not coated on the copper.

U.S. Pat. No. 4,780,248, Donohue et al

The patent discloses, inter alia, the use of lead nitrate-coated conductive metals in thick film compositions to improve the burnout characteristics of the organic medium.

BRIEF DESCRIPTION OF THE DRAWING

The drawing consists of five FIGS., each of which is a graphical correlation of particle shrinkage as a function of temperature for uncoated and coated conductive metal particles as follows:

| FIG No. | Conductive Metal | Oxide Coating |
|---|---|---|
| 1 | Pd | $TiO_2$ |
| 2 | 30/70 Pd/Ag | $MnO_x$ |
| 3 | Pd | $Al_2O_3$ |
| 4 | Pd | $SiO_2/Al2O_3$ |
| 5 | Pd | $BaTiO_3$ |

DETAILED DESCRIPTION OF THE INVENTION

A. In General

The invention is especially useful for making multilayer ceramic capacitor electrodes. The metal powder contained therein has been coated with an inorganic metal oxide. The coating oxides are insoluble in and non-reducible by the Pd and Pd/Ag metal powders throughout the burnout and firing range of the MLC. By coating the precious metal powders in this way, the temperature range over which the electrode shrinks can be increased to make it more compatible with the dielectric shrinkage. This invention is relevant to electrode/dielectric systems of all Pd/Ag ratios. Use of this technology is more effective than simple oxide powder additions to electrode pastes since the oxide is present in a more well-distributed manner. The metal oxide coatings used in the invention may be either true metal oxides in the sense that they are anhydrous or they may be hydrous, i.e., they have water in their crystalline structure.

The coating of conductive metal particles to change the sintering characteristics of the metal is known in the prior art. For example, Siuta in U.S. Pat. No. 4,521,329 discloses the use of copper oxide-coated copper particles and in U.S. Pat. Nos. 4,594,181 and 4,600,604 he discloses the use of metal oxide-coated copper particles to alter the sintering and shrinkage characteristics of copper itself.

The oxide-coated metal powders of this invention have additional advantages, however, in that they are completely coated with the oxide as shown by Isoelectric Point measurements by electrophoresis. This technique is capable of measuring the surface charges characteristic on a powder surface. By comparing the Isoelectric Point of the uncoated powder versus the coated powder using electrophoresis, one can establish whether or not a coating has taken place, and from the value of the Isoelectric Point confirm what moiety has been coated onto the powder. For example, coating metal powder A with oxide B would change the Isoelectric Point of the coated powder A from that characteristic of metal powder surface of A to that of B. The coated powder should have substantially the same Isoelectric Point as the powder it is coated with. Completely coating the surfaces of metal powders for MLC electrodes results in no metal-to-metal contact and thus avoids the early onset of sintering. This has the advantage of ensuring that early sintering cannot occur, sintering shrinkage mismatch is minimized, and the probability of formation of physical defects such as delaminations and the like occurring during part firing is reduced.

The metal coatings on the coated particles of the invention are ordinarily at least 1000 $A^\circ$ (0.1 micron) and are preferred to be at least 2000 $A^\circ$ or even higher so long as the tap density of the coated particles is at least as great as that of the uncoated particles.

In addition, the powders of the invention have the advantage that the coating process does not decrease the measured powder tap density relative to the starting uncoated Pd or Pd/Ag powder, and in most cases increases it. Tap density is a measure of the degree of agglomeration in the electrode powder. The higher the tap density, the lower is the degree of powder agglomeration. Use of a deagglomerated powder is desirable in MLC electrodes since agglomerated powders will print with rough dried print surfaces, thereby forcing the MLC dielectric layer to be thicker in order to avoid contact between electrodes of opposite polarity and/or long term reliability problems. In addition, agglomerated powders also necessitate the use of more metal during the printing process in order to obtain a continuous fired metal film in the capacitor. It is therefore preferred that the tap densities of the particles coated in accordance with the invention be at least 90% as high as the tap density of the corresponding uncoated powders. It is further inferred that the tap density of the coated particles exceed the tap density of the uncoated particles.

A further advantage of the oxide-coated powders described in this invention is the likelihood of improved dispersibility of the powder in water-based electrode paste vehicles. Typical MLC electrode paste compositions contain a completely carbon-based liquid solution of polymer in a solvent blend which acts as a vehicle for depositing the metal powder onto the substrate. As environmental regulations become more stringent, use of carbon-based electrode vehicles may be restricted, and water-borne vehicle systems may be required. It is well-known in the powder dispersion field that powders with polar surfaces, such as those exhibited by the oxide-coated metal powder surfaces of this invention, are more easily and stably dispersed into water-based vehicles. As noted above, the quality of the powder dispersion into the vehicle of an MLC electrode paste is a key factor in determining ultimate paste performance. The superior dispersion possible with oxide-coated metal powders versus uncoated metal powders in water-based vehicles will contribute to better paste performance.

B. Conductive Metal

Conductive metals which can be used in the invention are Pd, Ag, Pt, Au, Cu, Ni, alloys of the aforementioned metals, and their oxide precursors.

As used herein, the term "oxide precursor" refers to metal oxides which under normal thick film firing conditions are reduced to the metallic zero valence form ($Me^0$).

As used herein, the term "alloy powder" refers to a powder which, if examined using X-ray diffraction techniques, would exhibit the presence of either a single phase or multiple phases.

The particle size distribution of the conductive metals is not critical with respect to the effectiveness of the invention, but as a practical matter should be from 0.1-10 $\mu m$ and preferably 0.3-3 $\mu m$, basis equivalent particle diameter. It is also preferred that the metals be easily dispersed in the organic medium and non-flake in morphology.

C. Metal Oxide

The metal oxides which may be used as coating materials for the coated particles of the invention are refractory metal oxides which are insoluble in the electrically conductive metal under firing conditions and not reduced when they are subjected to non-oxidative firing conditions. It is essential that they be insoluble in the conductive metal for the reason that the solution of metal oxides in such metals tends to promote sintering. It is also essential that they be non-reducing under thick film firing conditions in order to avoid the formation of metals which can act as a low temperature flux which promotes sintering shrinkage upon firing.

Metal oxides which are suitable as coatings for use in the invention include the oxides of both noble metals and base metals. For example, the oxides of the noble metals Ru, Rh, Re, Ir, Pt and mixtures thereof are all suitable for use in the invention as are the oxides of the metals Al, Mg, Si, Ti, V, Cr, Mn, Fe, Co, Ni, Cu, Zn, Zr, Nb, Rh, Pd, Ba, Ce, Ta, W and mixtures thereof.

D. Organic Medium

Organic media suitable for use with the invention are selected according to the physical form in which the metal particles are applied. In particular, the particles can be applied as a thick film paste by screen printing.

When the particles are applied by screen printing, the particles thereof are mixed with an inert liquid medium (vehicle) by mechanical mixing (e.g., on a roll mill) to form a pastelike composition having suitable consistency and rheology for screen printing. The latter is printed as a "thick film" in the conventional manner.

The main purpose of the organic medium is to serve as a vehicle for dispersion of the finely divided solids of the composition in such form that it can readily be applied to ceramic or other substrates. Thus the organic medium must first of all be one in which the solids are dispersible with an adequate degree of stability. Secondly, the rheological properties of the organic medium must be such that they lend good application properties to the dispersion.

Most thick film compositions are applied to a substrate by means of screen printing. Therefore, they must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling, and good firing properties. Satisfactory appearance of the fired composition is also important.

In view of all these criteria, a wide variety of liquids can be used as organic medium. The organic medium for most thick film compositions is typically a solution of resin in a volatile solvent frequently also containing thixotropic agents and wetting agents. The solvents usually boil within the range of 130°-350° C.

Suitable solvents include kerosene, mineral spirits, dibutylphthalate, butyl Carbitol®, butyl Carbitol® acetate, hexylene glycol and high boiling alcohols and alcohol esters. Various combinations of these and other solvents are formulated to obtain the desired viscosity and volatility.

By far the most frequently used and a frequently preferred resin for this purpose is ethyl cellulose. However, resins such as ethylhydroxyethyl cellulose, wood rosin, mixtures of ethyl cellulose and phenolic resins, polymethacrylates of lower alcohols and monobutyl ether of ethylene glycol monoacetate can also be used.

A preferred vehicle for thick film applications is based on ethyl cellulose and β-terpineol in a weight ratio of about 1:8. The pastes are conveniently prepared on a three-roll mill. A preferred viscosity for these compositions is approximately 10-50 Pa.s. measured on a Brookfield RVT viscometer using a #6 spindle at 10 rpm. The amount of vehicle utilized is determined by the final desired formulation viscosity.

Among the thixotropic agents which are commonly used are hydrogenated castor oil and derivatives thereof and ethyl cellulose. It is, of course, not always necessary to incorporate a thixotropic agent since the solvent resin properties coupled with the shear thinning inherent in any suspension may alone be suitable in this regard. Suitable wetting agents include phosphate esters and soya lecithin.

The ratio of organic medium to solids in the paste dispersions can vary considerably and depends upon the manner in which the dispersion is to be applied and the kind of organic medium used. Normally, to achieve good coverage, the dispersions will contain complementally by weight 40-90% solids and 60-10% organic medium.

The pastes are conveniently prepared on a threeroll mill. The amount of medium is determined mainly by the final desired formulation viscosity and print thickness.

E. Test Procedures

1. Surface Area: Specific surface area was measured by the BET nitrogen adsorption method.
2. Elemental Analysis: Elemental analysis was performed by energy-dispersive x-ray fluorescence spectroscopy (EDAX).
3. Isoelectric Point: Isoelectric Point was measured using an automated electrokinetic analyzer Pen Kem System 3000, manufactured by Pen Kem, Inc., Bedford Hills, N.Y. This instrument measures the electrophoretic mobility of particles in a dilute suspension. Measurements are made at different pH levels and by graphically plotting the results, the isoelectric point, i.e., the pH at which the zeta potential is zero is ascertained. As used herein, the term "Isoelectric Point" refers to the measurement of this property by the above described procedure and as further particularized in the Examples.
4. Coating Thickness: Coating thickness was determined by examination of transmission electron microscopy photographs of the metal oxide-coated particles.

F. Coating Procedure

In the Examples hereinbelow, the coating of the conductive metal powders was carried out in the following manner. Oxide precursors salts were hydrolyzed in a stirred aqueous slurry of the metal powder. The coating thickness deposition rates normally run from 20-50 nm/hour. A pH probe is placed in a vessel containing the metal powder. The vessel is equipped with a paddle-type stirrer. Burettes of hydrolyzable salts dissolved in water and NaOH or other basic solutions such as NH4OH are mounted above the vessel. The two solutions are added to the bath containing the stirred precious metal powder at pHs where the salt is hydrolyzed to metal oxide.

When the desired coating level is reached, the flow of ingredients is discontinued and the coated particles are "cured" for approximately 30 minutes. The curing procedure "fixes" the coating on the precious metal powder. The coated particles are then placed in a sintered glass crucible where they are filtered and washed free of soluble salts. The coated precious metal powder is then dried at 120° C.

EXAMPLES

Example 1—Coating Pd Powder with $TiO_2$

Materials: Palladium Powder $TiCl_4$ Solution=29.6% $TiCl_4$ in water. Prepared by adding anhydrous $TiCl_4$ to chilled water.

50 grams of Pd powder is placed in 1000 ml deionized water in a two liter beaker equipped with a paddle stirrer and pH probe. The system is heated to 80° C. with a hot plate heater. The $TiCl_4$ reagent and 3% $NH_4OH$ solution are placed in burettes above the stirred beaker. At pH (6.0-6.5) the aqueous $TiCl_4$ is slowly added to bath controlling the pH with the $NH_4OH$ solution. 3.0 mls of the $TiCl_4$ solution was added to the stirred Pd particles over a one hour period. A curing time of one hour at 80° C./pH=(6.0-6.5) was used. The titanium oxide coated Pd powder was placed on a sintered glass crucible and washed with deionized water until chloride free. The titanium oxide coated palladium powder was dried for 12 hours at 120° C. The palladium powder at the start had a surface area of 1.8

$m^2/gr$. The titanium oxide coated palladium powder had a surface area of 6.0 $m^2/gr$. The starting palladium powder had an isoelectric point of 2.5. The $TiO_2$ coated powder had an isoelectric point of 4.5.

Example 2—Coating Pd/Ag Powder with Manganese Oxide

Materials: Pd/Ag alloy Powder $MnCl_2$ Solution = 10 gm $MnCl_2 \cdot 4H_2O$ (E. M. Science) G. R. Grade. Dissolved in deionized water to 0.005M solution.

50 grams of Pd powder is placed in 1500 mls deionized water in a two liter beaker equipped with a paddle stirrer and pH probe. The bath is heated to 60° C. with a hot plate heater. The pH is adjusted to 8.5 with 3% $NH_4OH$ solution. The $MnCl_2$ solution and 3% $NH_4OH$ solution are placed in burettes above the stirred coating vessel. The two ingredients are dripped into the bath. Over a 1.5 hour period, 20 ml of the stock $MnCl_2$ was used while controlling the pH at 8.5 with the 3% $NH_4OH$ solution. The coated palladium powder was cured for 30 minutes at pH 8.5/60° C. The coated powder was filtered and washed free of chloride ion using a sintered glass crucible. The uncoated palladium had a surface area of 1.8 $m^2/gr$. The manganese oxide coated palladium powder had a surface area of 7.2 $m^2/gr$. EDAX analysis showed composition values of 87.78% Pd and 1.22% Mn.

Example 3—Coating Ag/Pd Powder with Manganese Oxide

Materials: Ag/Pd Powder $MnCl_2$ Solution = 0.05M (E. M. Science G. R. Grade)

50 grams of silver/palladium powder is placed in 1500 mls deionized water in a two liter beaker equipped with a stirring paddle and pH probe. The batch is heated to 60° C. with a hot plate heater. The pH of the bath is adjusted to 8.5 with $NH_4OH$ solution. The $MnCl_2$ solution and 3% $NH_4OH$ are placed in burettes above the stirred vessel. 20 mls of the stock $MnCl_2$ solution is dripped into the stirred bath balancing the pH with 3% $NH_4OH$ solution over a period of 1.5 hours holding the pH at 8.5. The stirred and coated particles are then cured for 30 minutes. The coated powder is filtered and washed free of chloride ion using a sintered glass crucible. The uncoated Ag/Pd powder had a surface area of 1.2 $m^2/gm$. The manganese oxide coated powder had a surface area of 66.5 $m^2/gr$ and isolectric point of 4.3. EDAX analysis showed composition value of 26.54% Pd/69.88% Ag/3.58% Mn.

Example 4

A 100% Pd powder was coated with titanium oxide in the manner of Example 1. The starting powder had an isoelectric point of 2.5. The powder coated with titania had an isoelectric point of 4.5 versus the known isoelectric point of 4.7, a published value for titania, indicating the powder was essentially completely coated with titania and no Pd surfaces were uncovered. The tap density of the starting metal powder was about 3.2 g/cc; the coated powder was about 4.1 g/cc, indicating that the coating process had decreased the degree of agglomeration.

Figure 1:
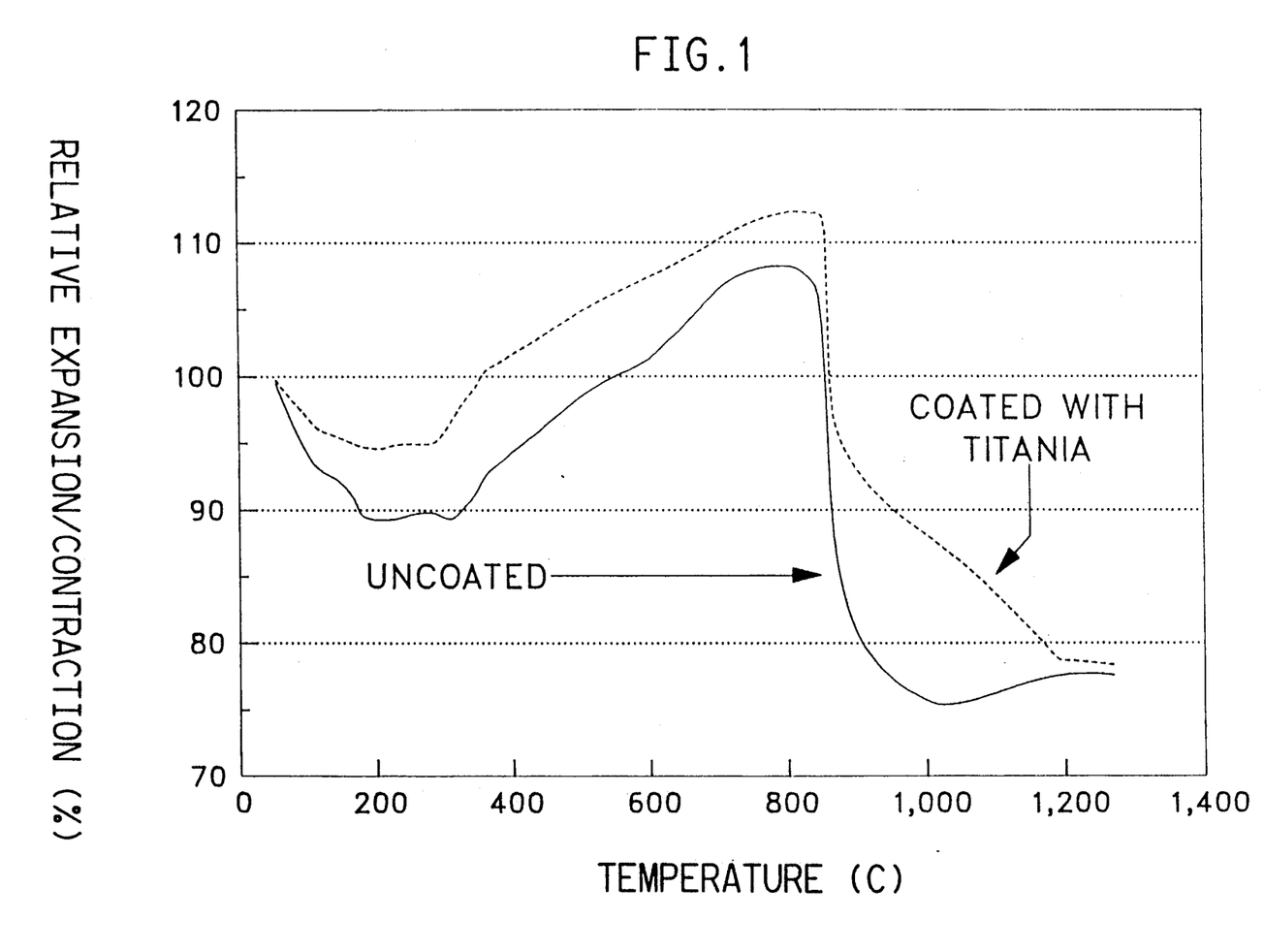

An MLC electrode composition was prepared using the coated powder. A control sample was the uncoated 100% Pd powder worked into a similar electrode composition. The sintering shrinkage of the electrodes were measured by first doctor blading the paste onto an alumina substrate, and measuring the sintering shrinkage in air from room temperature to 1300° C. at 10° C./min in an air atmosphere in a dilatometer. FIG. 1 compares the sintering shrinkage (by dilatometry) of the two electrodes. In the sample with no oxide coating, essentially all sintering is finished by 900° C. The sintering shrinkage of the electrode where the Pd was coated was titania shows the amount of sintering shrinkage occurring at 900° C. is reduced, with shrinkage continuing out to higher temperatures. By changing the sintering shrinkage characteristics of the Pd powder by coating it with oxide, the mismatch between the electrode and dielectric is reduced and MLC parts prepared using this type of electrode will have less tendency to form physical defects.

Example 5

A 30/70 Pd/Ag powder was coated with manganese oxide in a similar manner as described in the second example. The coated powder was characterized by electrophoresis and tap density. The Isoelectric Point of the powder with no coating was measured at 2.3 whereas the coated powder had an Isoelectric Point of 4.5, again indicating that the surface of the coated powder was almost purely manganese oxide. The tap density of the initial powder was 3.0 g/cc; the tap density of the manganese oxide-coated powder was 3.4 g/cc, again indicating that the coating process reduced the state of agglomeration of the Pd/Ag powder.

Figure 2:
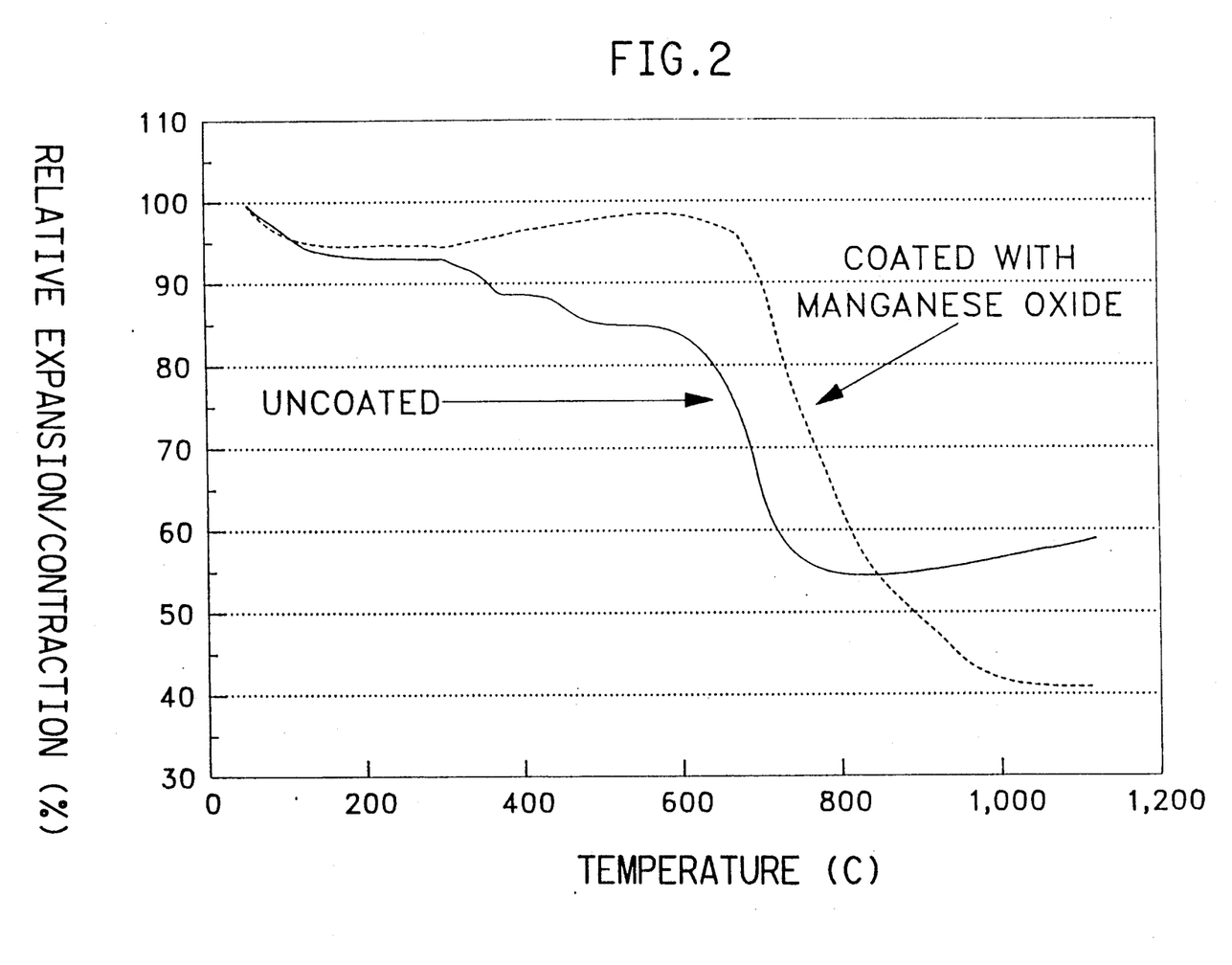

FIG. 2 compares the sintering shrinkage (by dilatometry) of the uncoated Pd/Ag powder versus the coated powders. Again, the oxide coating acts to move the point at which the sintering shrinkage of the Pd/Ag film occurs to a higher temperature.

Example 6—Coating Pd Powder with Hydrous Alumina

Twenty-five (25) grams of Pd powder was placed in 800 ml deionized water in a one-liter pryex beaker. The system is heated to 60° with a hot plate heater. Two cc $NaAl(OH)_4$ solution (0.385 gm/cc) and 20% HCL solution are placed in burettes above the stirred beaker. At pH 8.0, the aqueous sodium aluminate solution is added to the stirred bath controlling the pH at 8.0 with HCl. The hydrous alumina coating procedure was carried out for 30 minutes. A curing time of 15 minutes at pH 8.0°/60° C. was used prior to filtering and washing the alumina coated Pd on a sintered glass crucible. The coated powder was washed free of chloride ion and dried at 120° C. for 12 hours. The starting Pd powder had a surface area of 1.8 $M^2/gr$ and the hydrous alumina coated Pd powder had a surface area of 7.2 $M^2/gr$. The starting Pd powder had an Isoelectric Point of 2.5 and the hydrous alumina coated powder had an Isoelectric Point of 8.7.

Figure 3:
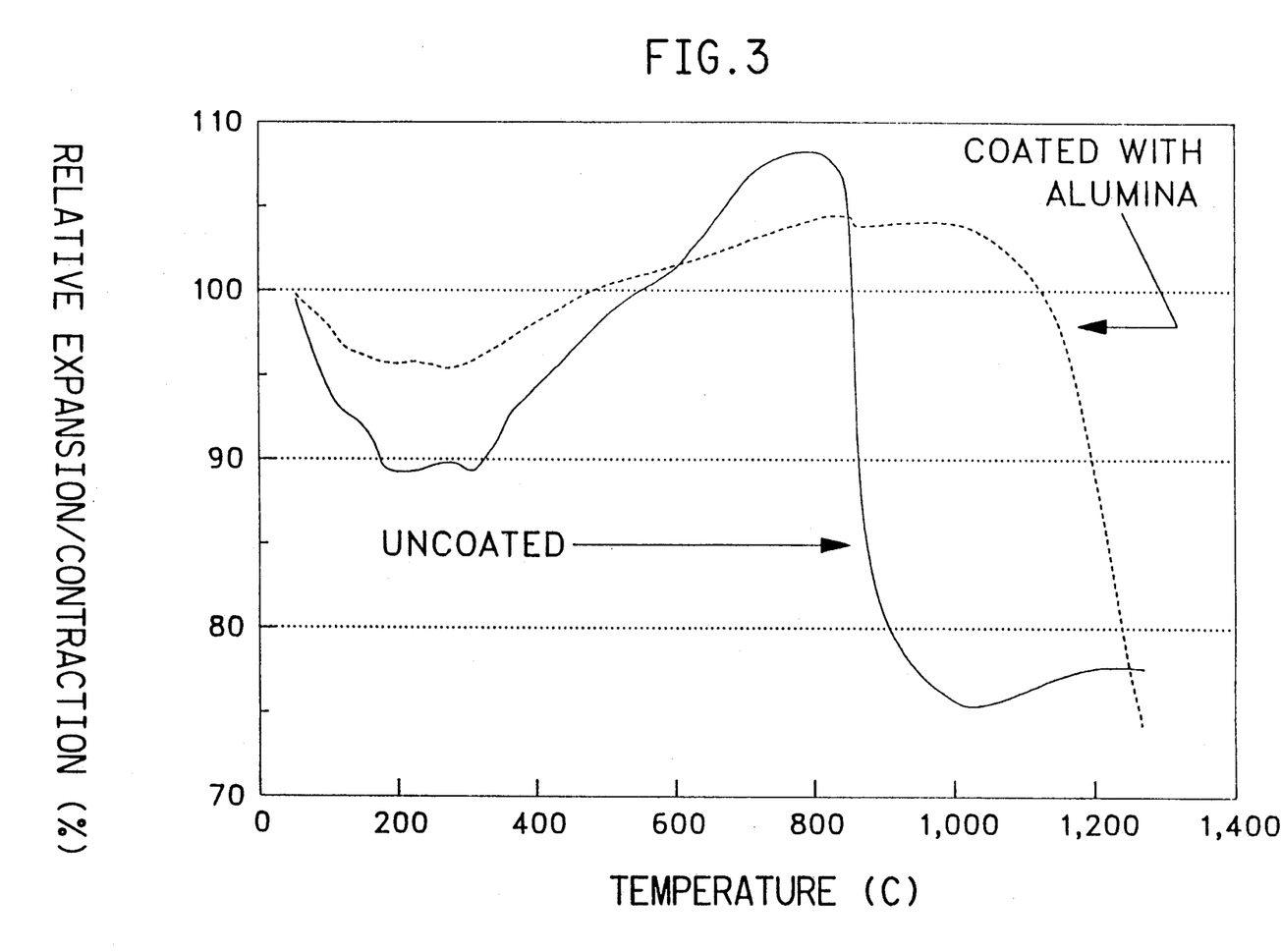

FIG. 3 compares the sintering shrinkage of the uncoated palladium particles with the sintering shrinkage of palladium powders coated with $Al_2O_3$. Again, the oxide coating acts to move the temperature at which sintering shrinkage of the palladium film occurs to a higher level.

Example 7—Coating Pd Powder with $SiO_2$ and $Al_2O_3$

Twenty-five (25) grams of Pd powder was placed in 800 ml deionized water in a one-liter pyrex beaker equipped with a paddle stirrer. Over a 40 minute period at pH 9.5 and 80° C., two grams of potassium silicate solution (0.25 gm $SiO_2$/gm solution), a total of 0.5 gm SiO₂ is added dropwise along with 20% HCl to keep the pH at 9.5 to coat the Pd powder with SiO₂. When the addition period was complete, the bath temperature was lowered to 75° C. and the pH adjusted to 8.5. One cc of Na(Al(OH)₄) solution, 0.38 gm Al₂O₃/cc solution was added to the stirred bath over a period of 15 minutes. The pH was controlled at 8.5 with 20% HCl solution added dropwise.

The bath was stirred for 15 minutes at pH 8.5/75° C. (curing period) prior to filtering the coated Pd powder from the aqueous medium. The coated Pd powder was filtered, washed free of salts and dried at 120° C. for eight hours.

The starting Pd powder had a surface area of 1.8 M²/gr. The SiO₂/Al₂O₃ coated Pd pwoder had a surface area of 6.2 M²/gr. The starting Pd powder had an Isoeectric Point of 2.5. The SiO₂/Al₂O₃ coated Pd had an Isoelectric Point of 6.0.

Figure 4:
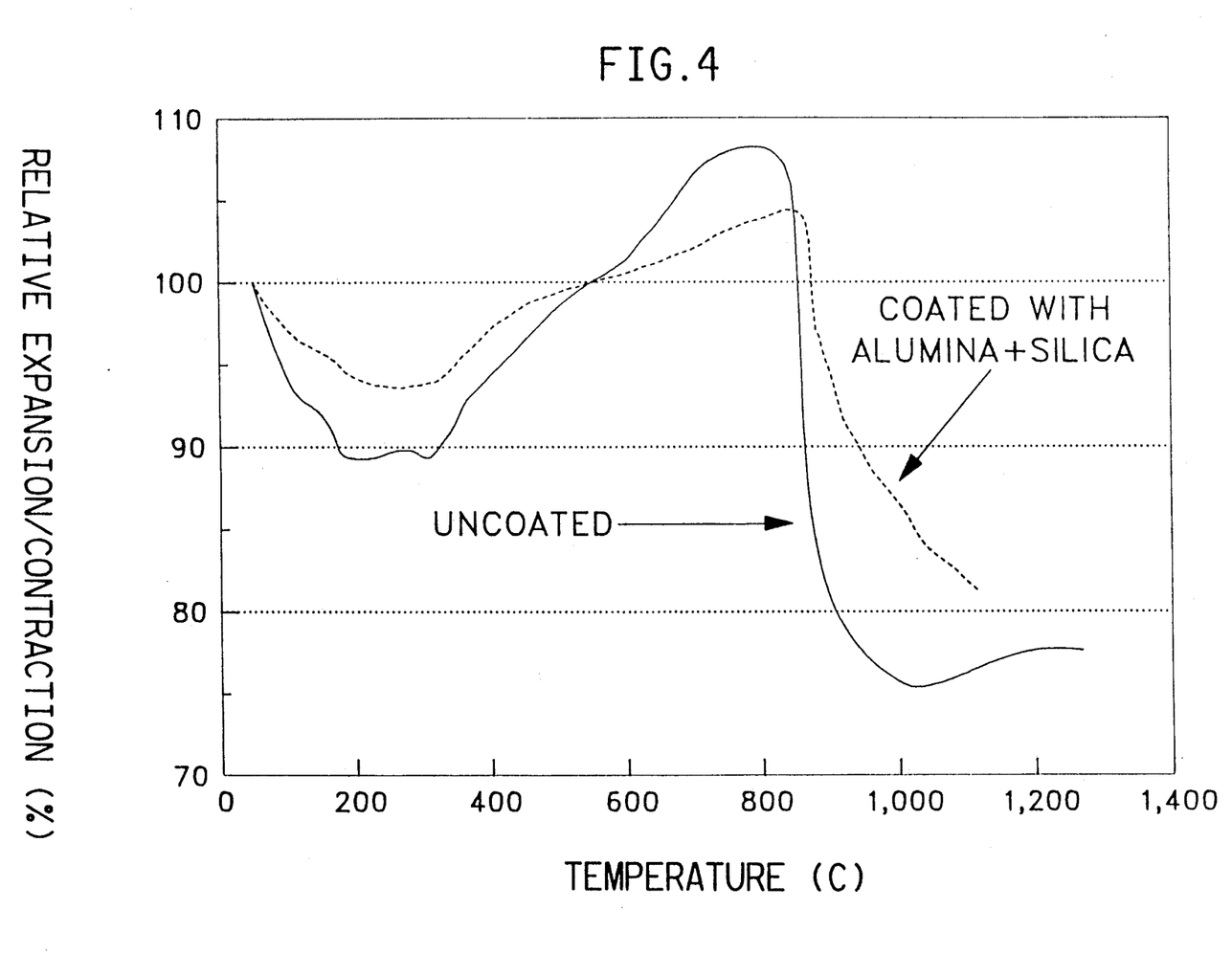

FIG. 4 compares the sintering shrinkage of the uncoated palladium particles with the sintering shrinkage of the palladium powders coated with both SiO₂ and Al₂O₃. The oxide coating acts to move the temperature at which sintering shrinkage of the palladium film occurs to a higher level.

Example 8—Coating Pd Powder with BaTiO₃

Twenty (20) grams of Pd powder was placed in 800 ml deionized water in a one-liter pryex beaker equipped with a paddle stirrer. Over a one-hour period, 4.2 grams of a Tyzor® LA/barium acetate solution (0.293 gm BaTiO₃/g solution) was added to stirred bath at pH 10-11. The Tyzor® LA/Barium acetate solution was from a master solution whose preparation will be summarized below. The pH of the bath was controlled with 10% NaOH solution. The BaTiO₃ coated Pd powder was cured for 15 minutes at pH 11/50° C. The Isoelectric Point of the starting Pd powder was 2.5. The Isoelectric Point of the BaTiO₃ coated Pd was 3.5. The surface area of the BaTiO₃ coated Pd powder was 6.2 M²/gr.

---
Tyzor® LA = Tyzor® Lactate
Tyzor® LA/barium acetate master solution
---
580.7 gm (1.0 moles) Tyzor® LA 13.76% TiO₂
255.4 (1.0 mole) barium acetate (alpha K186)
---

255.4 g Barium acetate and 580.7 gm Tyzor® LA were charged into a one-liter flask under an N₂ atmosphere and heated with a heating mantle. At 80° C. a complete solution observed the temperature was raised to 95° C. and held for ten minutes. The charge was then cooled to 27° C. and filtered through Super-Cel. (Super-Cel is a tradename of Johns-Manville, New York, N.Y. for diatomaceous earth filter aids.)

| Analysis | Theory | Found | ICP Analysis | Average |
|---|---|---|---|---|
| % BaO | 18.34 | 18.00 | 18.27 | 18.14 |
| % TiO₂ | 9.56 | 9.78 | 9.88 | 9.83 |

Adjustment of Ba/TiO₂ Ratio—788.8 of 60002-147 was charged in one-liter flask under N2. 9.55 g Barium acetate (alfa K186) was added to the charge and heated to 70° C. for one hour. The charge was cooled to room temperature. 798 gm was recovered (798.4 gm=theoretical). The charge was filtered through Super-Cel giving 774.5 grams product (60002-147A).

| Analysis | | | Average |
|---|---|---|---|
| % BaO | 18.87 | 18.96 = | 18.92 |
| % TiO₂ | 9.69 | 9.79 = | 9.74 |

Figure 5:
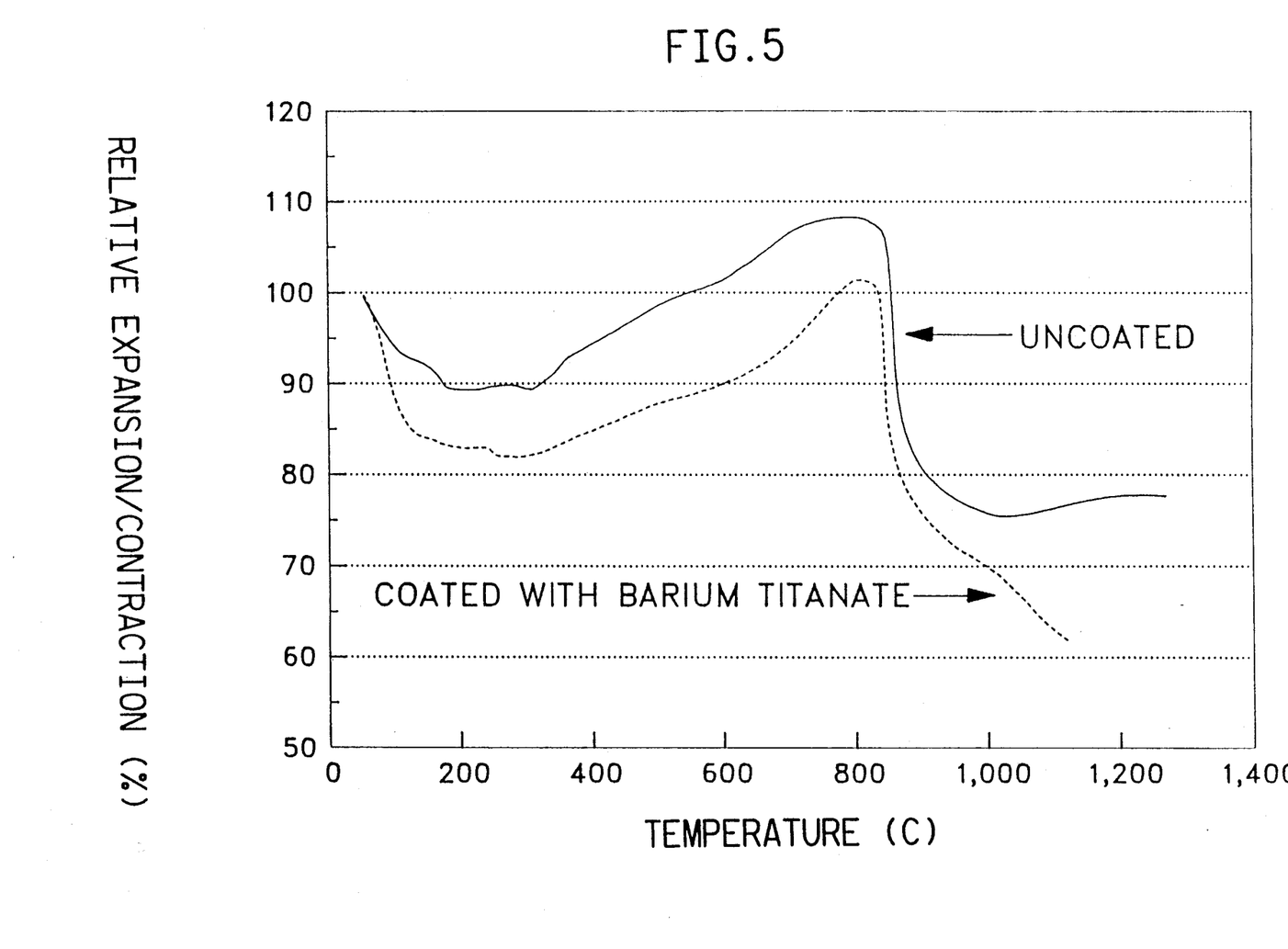

FIG. 5 compares the sintering shrinkage of the uncoated palladium particles with the sintering shrinkage of the palladium powders coated with BaTiO₃. The oxide coating acts raises the temperature at which sintering shrinkage of the palladium film occurs.

Example 9—Coating Ag Powder with PdO

Fifteen (15) grams of silver powder was placed in 800 ml deionized water in a one-half Pyrex® beaker equipped with a paddle stirrer. The stirred bath is heated to 35° C. with a hot plate heater. Thirty (30) grams of palladium II nitrate (7% Pd) and 5% NaOH solutions were placed in burettes above the stirred beaker. At pH 7.5 the palladium nitrate solution and NaOH are added dropwise to the stirred bath over a period of 30 minutes. When the additions were completed a 15 minute curing period was used prior to filtering the PdO coated Ag powder in a sintered glass crucible. The product was washed free of salts with room temperature water.

The uncoated Ag powder had a surface area of 1.4 M²/gr whereas the PdO coated Ag powder had a surface area of 4.4 M²/gr. The Isoelectric Point of the starting silver power was 1.5 and the PdO coated silver powder 5.0.

A Dilatometer scan was run in the same manner as the previous examples on a dried paste prepared containing the PdO-coated Ag powder. Dilatometer scans of pastes containing 100% uncoated Ag powder typically show the beginning of sintering shrinkage at temperatures between 200° and 500° C. The scan for the paste with coated Ag showed, however, that the PdO coating underwent additional Pd oxidation at temperatures above about 400° C., then underwent subsequent reduction back to Pd with simultaneous sintering shrinkage above 800° C. The net effect of the coating was to inhibit the sintering shrinkage of the Ag to the temperature range at which PdO reduces back to Pd (essentially at 800° to 850° C.), a 350° to 650° C. increase in the temperature at which the Ag sinters and shrinks.

We claim:

1. Finely divided particles of electrically conductive metal selected from the group consisting of Pd, Ag, Pt, Au, Cu, Ni and mixtures and alloys thereof having a coating thereof of a refractory metal oxide which is insoluble in the electrically conductive metal and non-reducing in the present of the electrically conductive metal, (1) the coating being sufficiently thick that the Isoelectric Point of the coated conductive metal particles is at least 1 unit higher than the Isoelectric Point of particles of the metal, (2) the tap density of the coated metal particles is at least 90% of the tap density of the uncoated metal particles, and (3) the metal oxide coating consitutes as least 0.05% by weight of the coated particles.

2. The coated metal particles of claim 1 in which the electrically conductive metal is Pd.

3. The coated metal particles of claim 1 in which the electrically conductive metal is an alloy of Pd and Ag.

4. The coated metal particles of claim 1 in which the coating is an oxide of a base metal selected from the group consisting of Al, Mg, Si, Ti, V, Cr, Mn, Fe, Co, Ni, Cu, Zn, Zr, Nb, Rh, Pd, Ba, Ce, Ta, W and mixtures thereof.

5. The particles of claim 4 in which the metal oxide of the coating is hydrous $Al_2O_3$.

6. The particles of claim 4 in which the metal oxide of the coating is manganese oxide.

7. The particles of claim 4 in which the metal oxide of the coating is titanium oxide.

8. A thick film composition consisting essentially of the coated metal particles of claim 1 dispersed in an organic medium comprising a solution of polymeric binder and volatilizable solvent.

9. The particles of claim 1 having a plurality of metal oxide coatings.

10. The particles of claim 9 having a first coating of $SiO_2$ and an outer coating of $Al_2O_3$.

11. The particles of claim 1 in which the conductive metal is Ag.

12. The particles of claim 1 in which the conductive metal is Ag and the metal oxide coating is PdO.

13. The particles of claim 1 in which the conductive metal is Ag and the metal oxide coating is $Al_2O_3$.

14. The particles of claim 1 in which the Isoelectric Point of the coated particles is at least 3 units higher than the Isoelectric Point of the uncoated conductive metal particles.

15. The particles of claim 1 in which the tap density of the coated particles is greater then the tap density of the uncoated metal particles.

16. A multilayer ceramic capacitor comprising a plurality of screen-printed and fired electrode layers of the thick film composition of claim 8 sandwiched between dielectric layers.

* * * * *